April 20, 1937.　　　　M. H. EDMONDSON　　　　2,077,747
POWER STEERING MECHANISM
Filed Oct. 8, 1934　　　　4 Sheets-Sheet 1
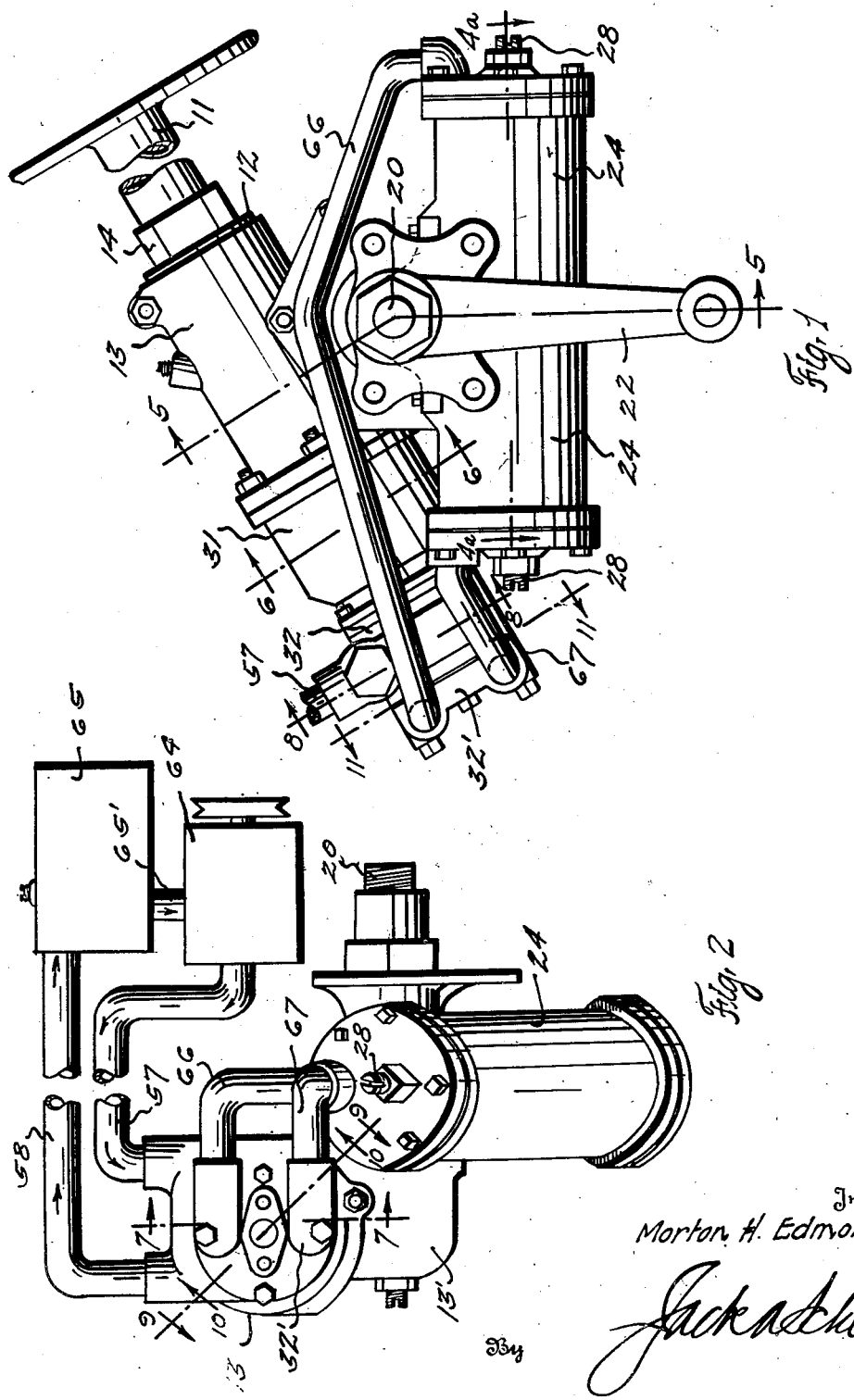
Inventor
Morton H. Edmondson
By Jack Ashley
Attorney

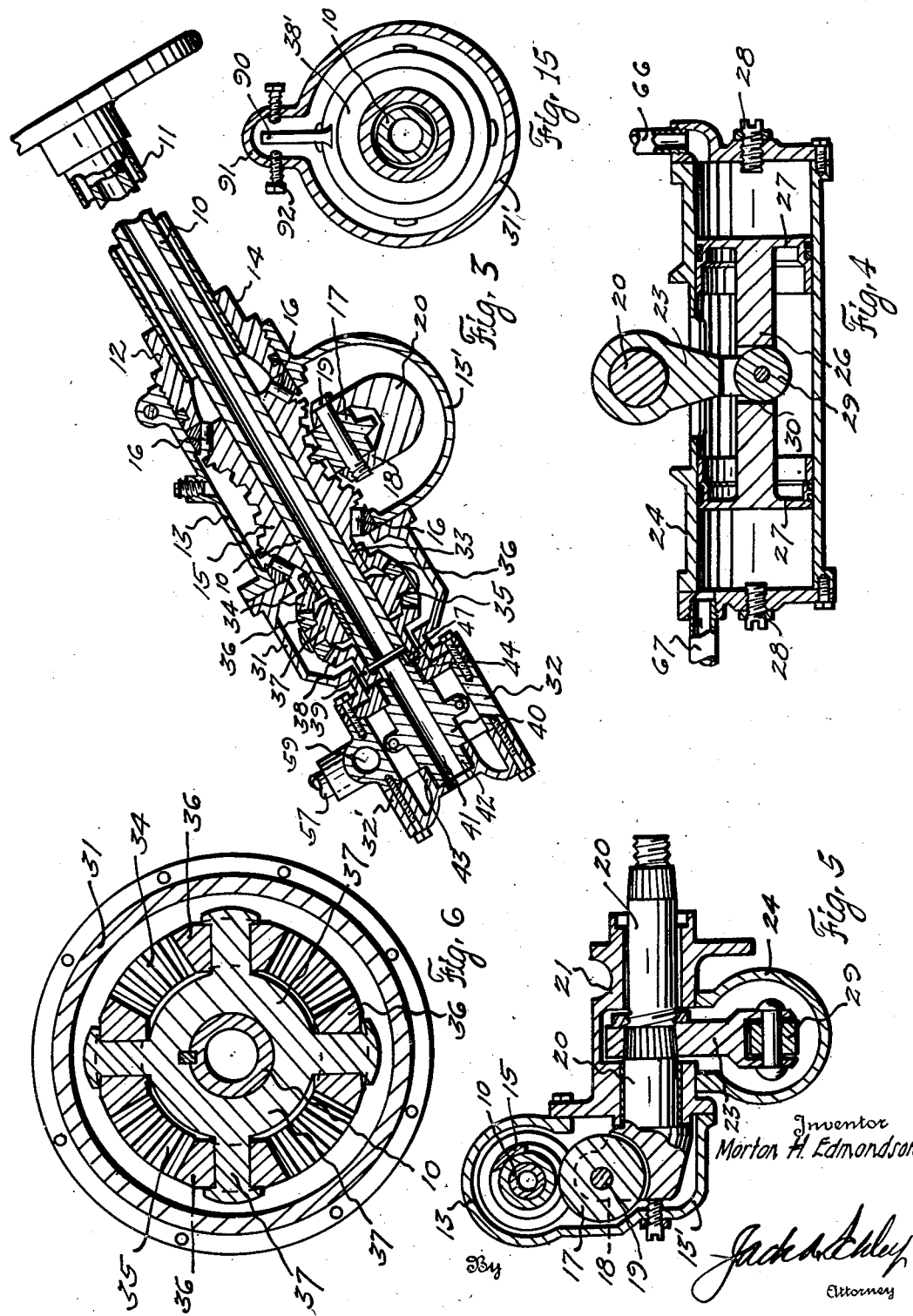

April 20, 1937. M. H. EDMONDSON 2,077,747
POWER STEERING MECHANISM
Filed Oct. 8, 1934 4 Sheets-Sheet 3
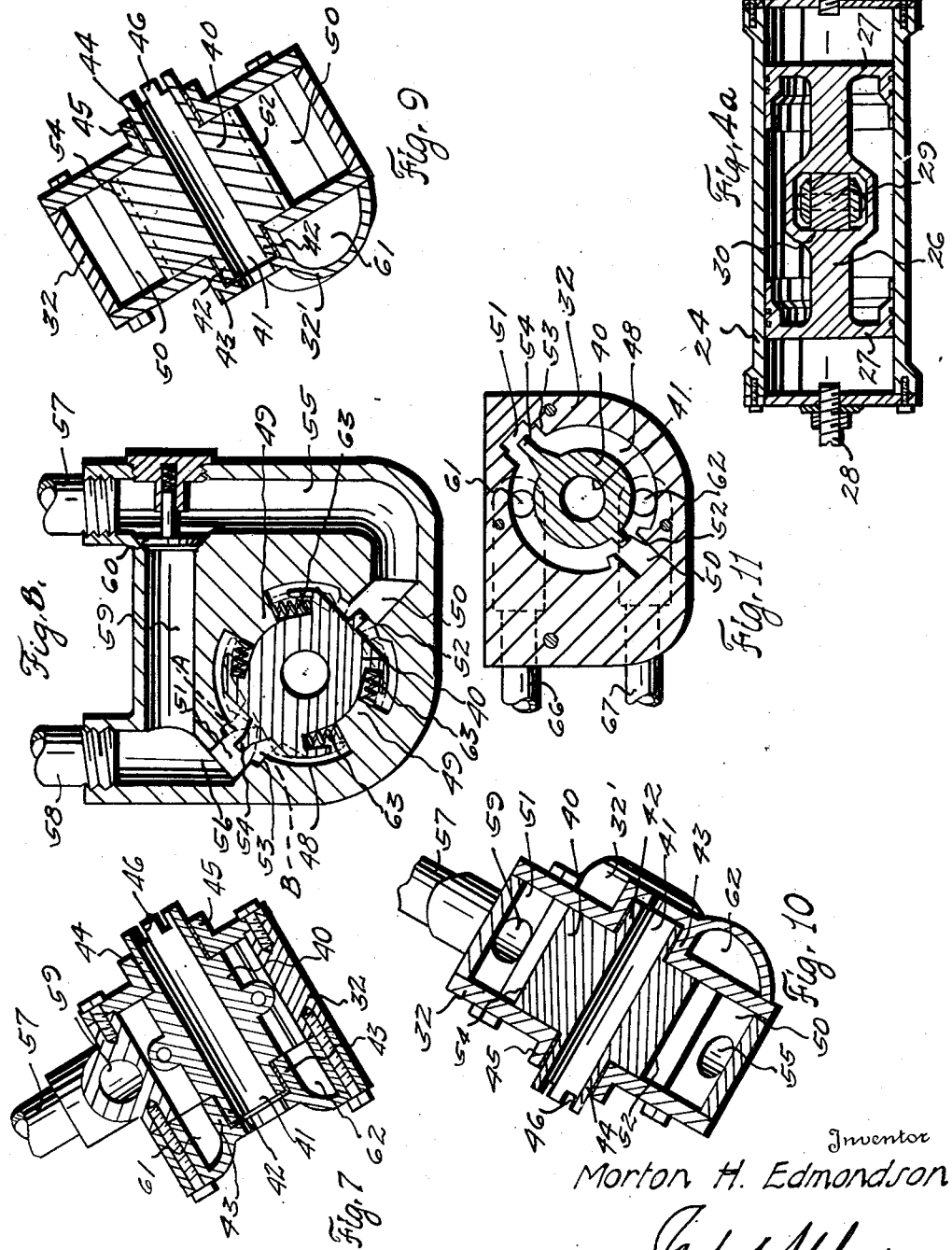

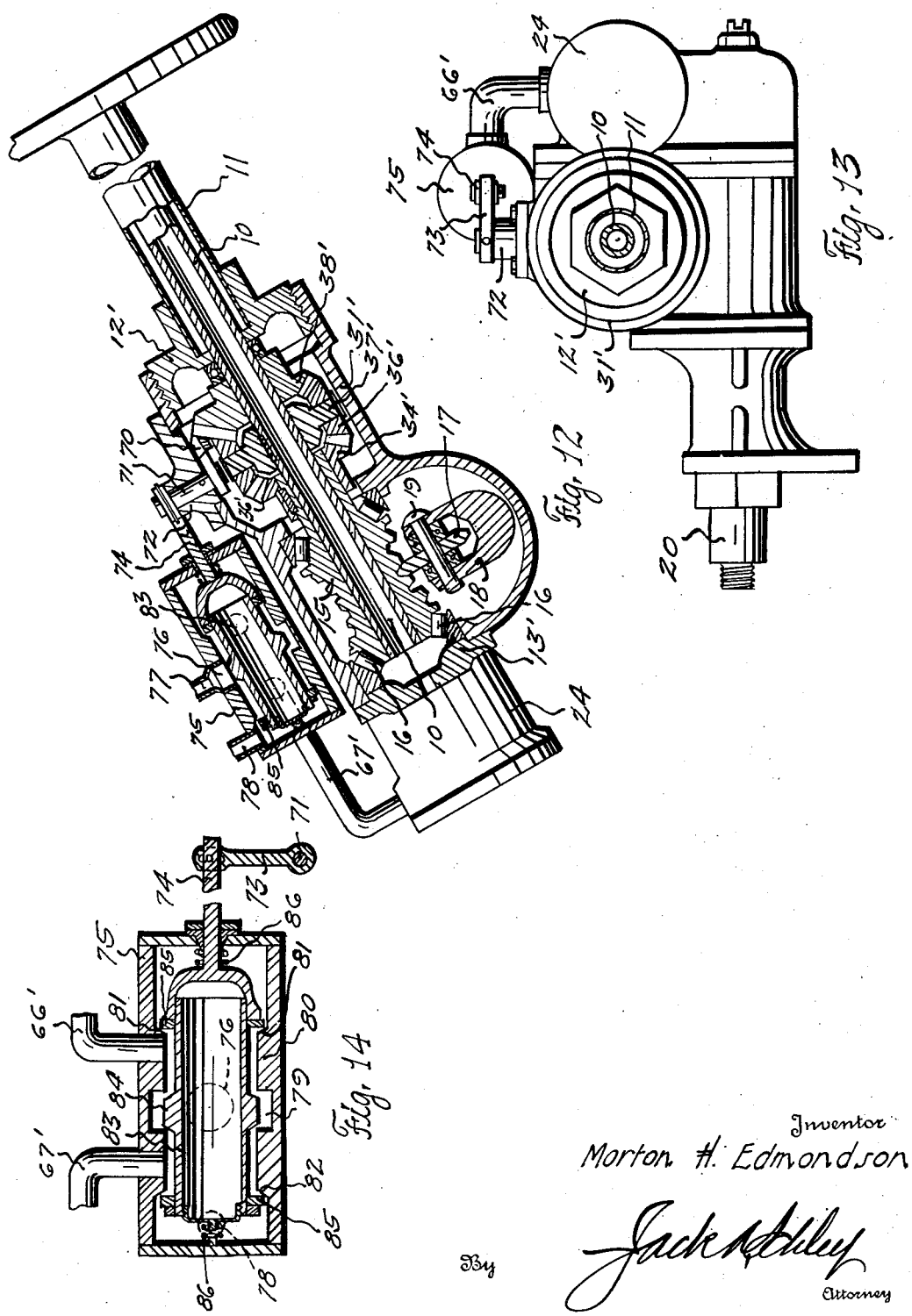

Patented Apr. 20, 1937

2,077,747

UNITED STATES PATENT OFFICE 2,077,747

POWER STEERING MECHANISM

Morton H. Edmondson, Greenville, Tex.

Application October 8, 1934, Serial No. 747,394

4 Claims. (Cl. 180—79.2)

This invention relates to new and useful improvements in control mechanism for motor vehicle steering gearing.

One object of the invention is to provide an improved control mechanism which may be incorporated with the usual steering control for motor vehicles, and which will efficiently control the application of auxiliary power to the steering mechanism of the vehicle to make for more efficient and less laborious steering as well as for safety; and the invention in some respects is an improvement upon my former application which was filed July 13, 1933, Serial No. 680,271 which was co-pending with this application and issued November 20, 1934 as Patent No. 1,981,591.

An important object of the invention is to provide an improved and simplified control mechanism for power steering of motor vehicles, whereby under normal conditions auxiliary steering power will not be applied, but upon the imposition of an increased load such as in making a turn or steering requiring increased effort, this control mechanism will become automatically operative to supply the auxiliary steering power in the proportion needed; however, such mechanism being arranged to automatically interrupt the application of the auxiliary steering power when it is not needed, thereby allowing the steering mechanism to be manually controlled in the usual way. A particular advantage of the improvement is that it permits a high gearing ratio to be used between the steering worm and the steering sector while a low steering ratio between the front wheels and the steering wheel may be employed.

Another object of the invention is to provide an improved steering mechanism employing fluid pressure operated elements for supplying auxiliary power when needed, and arranged so that the fluid is normally circulated under substantially no more than static pressure, but whereby the pressure of the fluid may be built up in proportion as the load is increased to supply the auxiliary power necessary to provide the needed assistance in steering under increased loads.

A further object of the invention is to provide an improved control mechanism so arranged that resistance to its operation is built up as the steering load increases in proportion to such load; and conversely whereby, the resistance is proportionately decreased as the load decreases. This imparts a sensitiveness to the steering wheel, whereby the driver at all times has proper control of the vehicle.

Another object of the invention is to provide an improved valve mechanism for applying the auxiliary power to the steering load and actuated by the steering wheel in proportion and as needed.

Still another object of the invention is the provision of an automatic by-pass for the fluid trapped in the mechanism, whereby the steering gear may be operated in the usual manner, in case the source of fluid supply fails, or when the engine of the motor vehicle stops, or when the vehicle is being towed, or for any other reason.

An important object of the invention is to provide a steering gear controlling mechanism which may be built into the steering column and confined in a reasonably small space.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a side elevation of a mechanism constructed in accordance with the invention, Figure 2 is an assembled view of the mechanism and the fluid supply means, Figure 3 is a longitudinal vertical-sectional view of the controlling mechanism, Figure 4 is a longitudinal sectional view of the power cylinder, Figure 4a is a horizontal longitudinal sectional view of the power cylinder taken on line 4a—4a of Figure 1, Figure 5 is a transverse sectional view taken on the line 5—5 of Figure 1, Figure 6 is an enlarged transverse sectional view taken on the line 6—6 of Figure 1, Figure 7 is a transverse sectional view taken on the line 7—7 of Figure 2, Figure 8 is a transverse sectional view taken on the line 8—8 of Figure 1, Figures 9 and 10 are transverse sectional views taken on their respective lines on Figure 2 and looking in opposite directions.

Figure 11 is a transverse sectional view of the valve taken on line 11—11 of Figure 1.

Figure 12 is a view similar to Figure 1 showing a modified form of the invention, Figure 13 is an end elevation of the same, Figure 14 is a sectional view of the valve, and Figure 15 is a transverse sectional view showing another form of stop means for limiting the rotation of the control valve.

In the drawings the numeral 10 designates the ordinary tubular steering shaft which is journaled in the usual sleeve 11. The lower end of the sleeve terminates in a bushing 12 which is screwed into a cylindrical housing 13 and is provided with a wrench neck 14 common in this art. The parts which have been described are similar to those now in common use.

A concaved worm 15 is rotatably mounted on the shaft within the housing and is supported by roller bearings 16 of the usual construction. At its center the worm meshes with a worm pinion 17 which is journaled in a bracket 18 on a pin 19. The bracket 18 extends upwardly from one end of the sector shaft 20 as is best shown in Figure 5. The housing 13 has a depending portion 13' which encloses the worm pinion 17 and one end of the shaft 20. It will be noted that the pinion 17 is of the single worm type and the ratio between the worm and the pinion is relatively high in accordance with the practice in this art.

The sector shaft 20 is of the usual construction and is mounted in an extension 21 so that one end projects therefrom to receive the steering arm 22 which is connected with the steering gear in the usual manner. A power arm 23 (Figs. 4 and 5) is fastened on the shaft 20 intermediate its ends and depends into a power cylinder 24 which is carried by the extension as is best shown in Figures 1, 2, and 5. The extension 21 carries the usual bracket whereby the structure may be fastened to the frame of the motor vehicle.

Within the cylinder 24 the power arm 23 is pivoted to the central portion of a cross-head 26 secured at each end to a piston 27 working in said cylinder. Set screws 28 are mounted in the ends of the cylinder to limit the travel of the pistons and thereby limit the swing of the arm 23. In order to compensate between the swinging motion of the arm and the reciprocating motion of the cross-head, a roller 29 is mounted on the end of the arm and engages in a slot 30 in said cross-head. It is apparent that by alternately supplying a fluid under pressure to the ends of the cylinder, the pistons will be reciprocated therein and the power arm 23 will be swung, whereby the shaft 20 will be rotated and the steering gear thus operated by means of auxiliary power, which will be more clearly explained hereinafter.

The worm 15 being carried by the roller bearing 16 in the housing 13, as is best shown in Figures 3 and 5, is not attached to the shaft 10 and thus the shaft and the worm may rotate independently of each other. A differential box 31 is fastened to the lower end of the housing 13 and a valve case 32 is fastened to the lower end of the box 31, as is clearly shown in Figures 1 and 3. The worm 15 is provided with an integral collar 33 at its lower end projecting into the box 31. The ring gear 34 of a differential 35 is keyed on the collar 33 of the worm 15 for the purpose of rotating said worm. This gear meshes with pinions 36 carried by a spider 37 (Figures 3 and 6) which is keyed on the shaft 10. The pinions and the gear are beveled. The pinions mesh with a beveled ring gear 38 similar to the gear 34. The gear 38 is provided with a box hub 39 and the shaft 10 terminates in this hub. The differential 35 is mounted in the box 31.

A valve 40 is mounted in the case 32, as is best shown in Figures 3 and 7 to 10 inclusive. This valve has an axial bore 41 in alignment with the bore of the shaft so that electric wires, control rods, etc., may be passed upward through the steering column. The valve is provided with a lower trunnion 42 suitably journaled in a bearing socket 43 in the lower end of the case 32 and an upper trunnion 44 journaled in a collar 45 on the upper end of said case. The collar telescopes the lower end of the box 31 as shown in Figure 3 and the trunnion projects beyond said collar as is shown in Figures 7 to 10 inclusive. The projecting end of the trunnion 44 is provided with teeth 46 which engage in similar teeth 47 in the lower end of the hub 39. It is pointed out that when the shaft 10 is rotated in either direction, the spider 37 of the differential 35 will be rotated, whereby the ring gear 34 will be rotated, thus imparting motion to the worm 15 and thereby operating the steering gear. Unless fluid is supplied to the cylinder 24, there will be no auxiliary power delivered to the shaft 20 and thus the steering gear will be manually operated in the usual way.

The main purpose of the gear 38 is to operate the valve 40, and therefore it may be connected to said valve in any suitable manner. The valve controls the flow of pressure fluid to the cylinder 24, but it is obvious that it might control the flow of fluid to any kind of a power operating device for assisting in the steering.

Referring to Figures 7 to 11, inclusive, it will be seen that the valve 40 is mounted in a chamber 48, which has diametrically opposite abutments 49, as is best shown in Figure 8. The chamber has diametrically opposite ports 50 and 51. The valve 40 is provided with a transverse blade 52, the end of which is slightly rounded so as to have a snug turning fit with the marginal face of the port 50, which may be any suitable shape, such as elliptical or rectangular. So long as the blade remains over the port, fluid may flow on each side thereof, but when the valve is shifted or rotated in either direction, so as to move the end of the blade into contact with the marginal face on either side of the port, the fluid will be diverted to one side or the other of the chamber. When the blade is shifted to one side, the supply of fluid will be gradually reduced on the side toward which the blade is being moved, while on the trailing side the supply of fluid will be increased. From this it will be seen that the valve may be shifted either to restrict the flow of fluid or to entirely cut it off.

The valve is also provided with a diametrically opposite blade 54, which acts as a stop and which has a greater radial extension from the center of the valve than the blade 52. This causes the valve to be overbalanced. The port 51 has a countersunk rectangular seat 53 into which the blade 54 projects. The shifting or rotation of the valve is limited by the engagement of the blade 54 with the opposite sides of the seat.

The port 50 is connected with a duct 55, while the port 51 is connected with a duct 56. The duct 55 is connected with a supply pipe 57 and the duct 56 is connected with a return pipe 58. The ducts are connected with each other by a by-pass 59 having a spring-pressed valve 60 (Figure 8) closing it off from the duct 55 and adapted to open into said duct so that fluid may by-pass to the duct 55. If the circulation of the fluid should be stopped, the pistons 27 would be moved by the arm 23, if the steering gear was turned to make a curve or the like. In order to prevent and air lock the by-pass valve 60 is provided and would open and relieve the suction.

The case 32 has a cap 32' on its lower end which is provided with ports 61 and 62. These ports are arranged so that the port 61 will be in the upper portion of the chamber 48, relatively above the ports 50 and 51, while the port 62 will be below said ports 50 and 51 in the lower portion of said chamber. It is obvious that as the fluid under pressure passes through the chamber, it may be diverted into either of the ports 60 or 61 by shifting the valve 40. If the valve is shifted to the dotted line position marked A, then the fluid will be diverted to the upper port 61. But should the valve be shifted to the position shown in dotted lines B, then the fluid will be diverted to the lower port.

For resisting the operation of the valve, coiled springs 63 are housed therein on opposite sides of the abutments 49; consequently, the resistance offered by these springs must be overcome before the valve can be rotated. Referring back to Figure 3, it will be seen that when motion is imparted to the spider 37 of the differential 35 the ring gear 38 will be held stationary because of its attachment to the valve 40 due to the holding of said valve by said springs. This will permit the differential to turn the worm 15 in the usual way, the pinions rolling on the gear 38. But when the load becomes such that the increased effort necessary to rotate the shaft 10 is sufficient to overcome the tension of the springs 63, then the valve will be operated to apply the auxiliary power as will be hereinafter explained.

The pipe 57 is connected with a suitable pump 64 as shown in Figure 2, which may be located at any desirable point and driven by the motor of the vehicle. The return pipe 58 is connected with an oil reservoir 65 which may be located at any suitable point. It would be possible to build both the pump and the reservoir within the crank case of the motor or to mount them on the motor. It is obvious that so long as the blade 52 of the valve 40 does not engage either side of the port 50, all or a portion of the fluid which is being pumped through the pipe 57 will flow through the chamber 48 and thence through the pipe 58 back to the reservoir which is connected with the pump by a pipe 65'. It is to be particularly noted that the fluid while so flowing will be kept in circulation and will not be under pressure, except what might be termed a flowing or static pressure. The upper port 61 of the chamber 48 is connected by a pipe 66 with one end of the cylinder 24 as is best shown in Figures 1 and 2; while the lower port 62 is connected with the opposite end of said cylinder by a pipe 67.

The operation is as follows:

The springs 63 act to hold the valve 40 in a central or neutral position and their tension may be varied so that the effort or force required to rotate the valve is proportionately regulated. Ordinarily a slight increase of force over that required for normal turning of the steering shaft 10 would be sufficient to overcome the tension of the springs and thus rotate the valve. So long as the valve remains in its neutral or central position, as shown in full lines in Figure 8, the pumped fluid or liquid, such as oil, will continue to circulate without operating the auxiliary power mechanism.

By this arrangement the fluid will not be placed under pressure and there will be substantially no actuation of said mechanism, which is very important because of the obvious simplicity and the low cost of maintenance. With the valve in its neutral position, the shaft may be manually operated in the usual way and motion imparted to the worm 15 through the differential 55, the springs offering sufficient resistance to hold the ring gear 38 stationary during this activity. The springs act constantly to return the valve to a neutral position and when counteracting pressure on the valve is released, the springs will return the valve to its neutral position, irrespective of the position of the front wheels of the vehicle or the steering gear. The major portion of motor vehicle driving is in a direction which requires very little effort and, therefore, the steering gear may be operated during this period without the use of auxiliary power and under almost ideal conditions.

Several conditions may arise which would require an increased effort or the use of more force to operate the steering gear because of an increased load, such as that imposed in making turns, or in parking, or in holding the vehicle on the road against a high side wind, and other similar conditions. In order to supply sufficient auxiliary power to offset the increased load and thereby reduce the increased steering burden, the mechanism herein set forth is brought into action. The resistance offered by the increased steering load causes the driver to exert a slightly increased effort or to apply slightly more force to the turning of the shaft 10, and this is sufficient to overcome the resistance of the springs 63, whereby the valve 40 will be turned in one direction or the other, according to the direction of rotation of the shaft 10.

When the valve 40 is rotated the blade 52 will be swung to one side of the port 50, while the blade 54 will be swung to the opposite side of the port 51. This will restrict the flow of oil through one side of the port 51 and the pressure on this side of the blade 54 and the valve will be built up sufficiently to actuate the pistons 27 and the auxiliary steering mechanism. Because of the overbalancing action of the blade 54, the oil flowing through the restricted side of the port 51 and acting against the adjacent side of said blade, will offer resistance to swinging of said blade toward such stream of oil. This resistance will be in proportion to the steering load, because as the load increases and the steering effort likewise increases, the valve will be turned to further restrict the port 51, which will cause a corresponding increase in the built-up pressure. Thus, the driver will become sensitive to the steering condition by reason of such resistance.

If the rotation of the shaft 10 is such as to shift the valve 40 to the dotted line position A (Figure 8), then the pumped fluid will be diverted through the port 61 by way of the pipe 66 to the rear end of the cylinder 24. The pump will build up sufficient pressure in the fluid to displace the pistons 27 toward the forward end of the cylinder 24, whereby the power arm 23 will be swung and sufficient auxiliary power applied to the sector shaft 20 to make the turning of the vehicle easy. If the shaft is turned in the opposite direction from a neutral position, the valve 40 will be shifted to the position shown in dotted line B in Figure 8, and the fluid will be supplied by the pipe 67 to the forward end of the cylinder, whereby the pistons will be moved rearwardly in said cylinder and the arm 23 swung accordingly. When fluid is supplied to one end of the cylinder, it is of course exhausted from the opposite end. Just as soon as the steering gear load is reduced to normal, the springs 63 will exert their tension and shift the valve 40 to a neutral position, whereby the fluid will be circulated and the application of auxiliary power discontinued.

A device of this character is subject to considerable change because the principles involved may be carried out in various manners, and in Figures 12 to 15 inclusive I have shown another form embodying the principles which have been explained. Instead of screwing the bushing 12 into the top of the housing 13, a bushing 12' is screwed into the upper end of a differential box 31' and this is mounted on the upper end of the housing 13' which is substantially the same as the housing 13. A gear 34' is keyed to the upper end of the worm 15 instead of to the lower end as Figure 3. The gear meshes with pinions 36' carried by a spider 37' which is keyed on the shaft 10. The pinions mesh with a ring gear 38' rotatably mounted on the shaft. The upper sector of this gear has its teeth extended so as to mesh with a segmental gear 70 fastened on the lower end of a shaft 71 journaled in a bearing boss 72 mounted on the box 31'.

A crank arm 73 is fastened on the upper end of the shaft 71 and is pivotally connected with a plunger rod 74 extending into a valve cylinder 75 as is best shown in Figures 12 and 13. The cylinder has a port 76 connected with a pipe 77 leading to the pump 64 like the pipe 57. An exhaust pipe 78 extends from the end of the cylinder and is connected to the reservoir 65 like the pipe 58. A pipe 66' similar to the pipe 66 is connected to the cylinder 24, while a pipe 67' similar to the pipe 67 is also connected to said cylinder. It will be seen that the flow of fluid to the cylinder 24 may be controlled in various ways.

The port 76 communicates with an annular recess 79 in the inner wall of an annular boss 80 formed in the cylinder 75. The boss has an annular seat 81 at one end and annular seat 82 at its opposite end. A tubular plunger 83 is slidably mounted in the boss and has a central valve collar 84 which has a snug-sliding fit in the boss so as to interrupt longitudinal passage of fluid between the boss and the plunger. The collar is not as wide as the recess 79 and consequently when in a neutral position, fluid may flow on each side of said collar, but when the plunger is moved in either direction, the flow toward one end of the cylinder is cut off. The recess 79 is located between the pipes 66' and 67', consequently by shifting the plunger the flow of fluid to the cylinder 24 may be controlled in the same manner as it is controlled by the valve 40. In order to hold the plunger in a neutral position, springs 86 are provided at each end thereof.

It will be noted that the plunger 83 has rings 85 at each end, of larger diameter than the bore of the boss 80, so as to engage the shoulders 81 and 82. These rings each present a greater area to the liquid flowing through the boss, than does the adjacent side of the collar 84, consequently when the plunger is shifted to restrict the escape of liquid from one end of the boss, thus building up pressure between the ring 85 at said end and the collar 84, this state of the liquid will offer resistance to further restricting of the escape, and the driver will become sensitive to the same.

For limiting the movement of the ring gear 38' which swings the gear sector 70, said gear is provided with an outwardly extending arm 90 on its rear side. The arm may be positioned at any point around the gear and extends outwardly into a recessed portion 91 formed in the casing 31'. Set screws 92 are threaded through the sides of the recessed portion and by observing Figure 15, it will be seen that the arm 90 swings between the inner ends of the screws. By adjusting the screws the movement of the ring gear 38' may be controlled.

What I claim and desire to secure by Letters Patent is:

1. Automotive steering mechanism comprising, a steering shaft, a transverse rock shaft having a gear sector and a steering arm extending therefrom for operating connection with conventional steering gear, a worm mounted to rotate freely on said steering shaft and in mesh with said gear sector, a power arm on said rock shaft, a power cylinder having a piston therein connected with said power arm adapted to operate the arm under abnormal load conditions, differential driving connecting means between the steering shaft and said worm for rotating the worm thereby during normal load conditions, and yieldable means connected with the differential connecting means adapted to be operated under abnormal steering load conditions, valve mechanism adapted to be operated by said yieldable means when said means moves by the differentially connected steering shaft, means for normally circulating fluid through said valve mechanism and for building up pressure therein when it is operated by said yielding connection under abnormal steering loads, and means for directing the fluid under pressure in said valve mechanism to said power cylinder for operating the steering arm in either direction according to the operation of the steering shaft.

2. Automotive steering mechanism comprising, a steering shaft, a transverse rock shaft having a gear sector and a steering arm extending therefrom for operating connection with conventional steering gear, a worm mounted to rotate freely on said steering shaft and in mesh with said sector, a power arm on said rock shaft, a power cylinder having a piston therein connected with said power arm adapted to operate the arm under abnormal load conditions, a differential gear mechanism on said shaft adapted to be driven thereby, and having two independent driving connections associated therewith, one of said driving connections adapted to drive the worm, gear sector, rock shaft and said steering arm under normal load conditions, normally neutral yieldable means adapted to be moved by the other driving connection of said differential gear mechanism under abnormal steering load conditions, valve mechanism adapted to be operated by said yieldable means when said means moves by the drive through the connection between it and said differential gear mechanism, means for normally circulating fluid through said valve mechanism and for building up pressure therein when it is operated under abnormal steering conditions by the driving connection with the differential gear mechanism, and means for directing the fluid under pressure in said valve mechanism to said power cylinder for operating the steering arm in either direction according to the operation of the steering shaft.

3. In an automotive steering mechanism, in combination with a conventional steering shaft, gear sector, rock shaft and steering arm, of a power arm on said rock shaft, a worm meshing constantly with said gear sector, a power cylinder having a reciprocatory piston therein, said piston operably connected to said power arm of said rock shaft, a valve casing having a circulatory connection with a pumping source of fluid and opposed communicable connections with said power cylinder whereby to supply fluid to opposite sides of said piston, a reciprocatory valve member in said valve casing normally neutrally positioned whereby the fluid is circulated through the valve casing without affecting said piston in the power cylinder, said valve being movable in opposite directions to check circulation and build up fluid pressure against said piston, and a differential gear connection between said steering shaft and said worm and between said shaft and said reciprocatory valve member whereby under normal conditions the worm is actuated by manual operation of the steering shaft and the steering arm accordingly operated through the intermediary of the gear sector on said rock shaft, but under abnormal conditions said piston in said power cylinder is actuated to operate said steering arm through the intermediary of the power arm on said rock shaft in accordance with the direction said steering shaft is manually rotated.

4. An automotive steering mechanism comprising a steering arm connectible with a conventional steering gear, a power transmission shaft for operating said steering arm, a gear sector on said power transmission shaft, a power arm on said power transmission shaft, a worm meshing with said gear sector, a power cylinder, a reciprocatory piston in said power cylinder, said piston connected operably with said power arm whereby to move the arm in opposite directions, means for supplying fluid to said power cylinder on opposite sides of said piston therein, said means including a casing having a circulatory connection with a pumping source of fluid and opposed fluid supply connections with said power cylinder on opposite sides of said piston therein, a reciprocatory valve member in said casing yieldably positioned normally neutral whereby the fluid from the source is circulated through said casing without affecting said piston in said power cylinder but movable in opposite directions to set up fluid pressure to move said piston in said power cylinder, a manually rotatable steering shaft, and a differential gear connection between said steering shaft and said worm and between the shaft and said reciprocatory valve member.

MORTON H. EDMONDSON.